April 27, 1943.　　　　H. O. PUTT　　　　2,317,938
HIGH SPEED HYDRAULIC TURBINE TRANSMISSION OR DRIVE
Filed July 31, 1940　　　5 Sheets-Sheet 2

Inventor
H. O. Putt
By Lester Sargent
Attorney

April 27, 1943.  H. O. PUTT  2,317,938
HIGH SPEED HYDRAULIC TURBINE TRANSMISSION OR DRIVE
Filed July 31, 1940  5 Sheets-Sheet 3
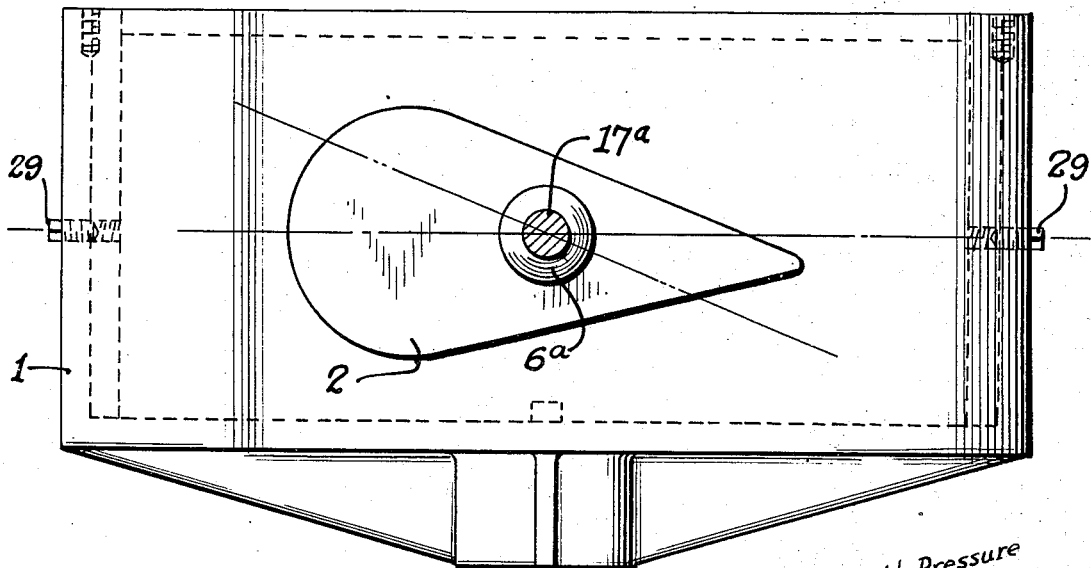
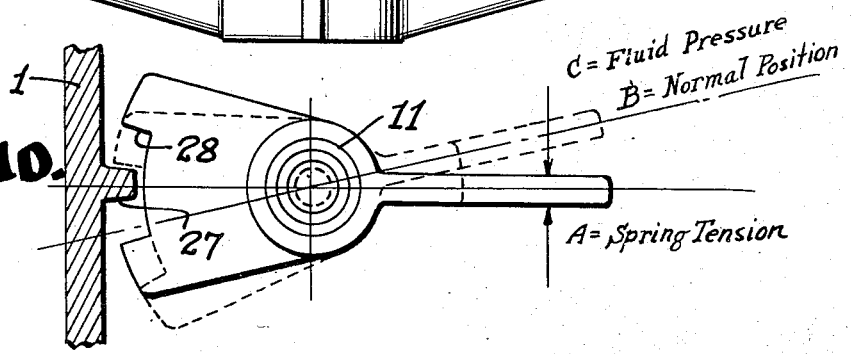
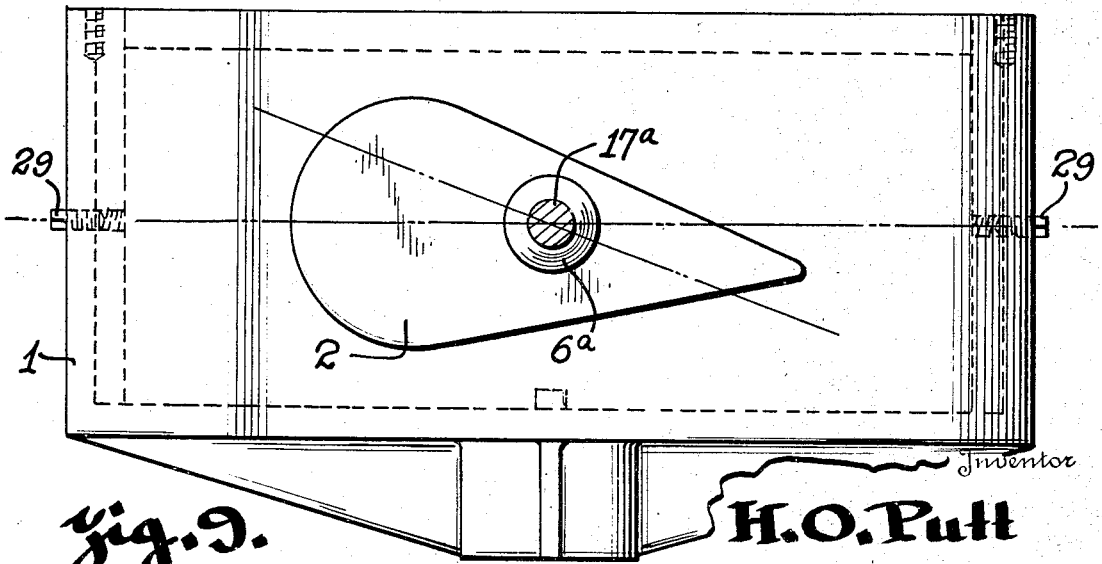

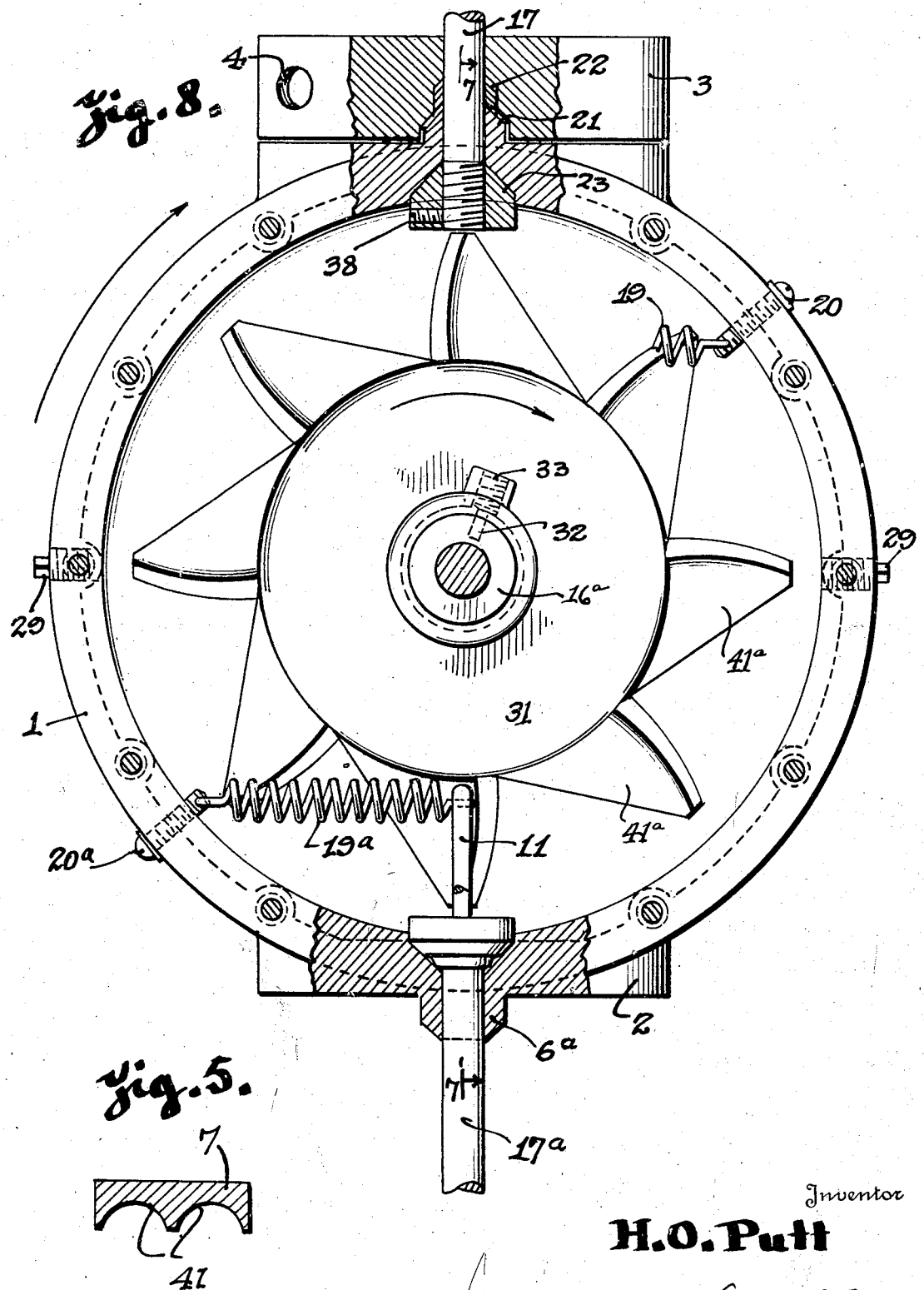

April 27, 1943. H. O. PUTT 2,317,938
HIGH SPEED HYDRAULIC TURBINE TRANSMISSION OR DRIVE
Filed July 31, 1940 5 Sheets-Sheet 5

Inventor
H. O. Putt
By Lester L. Sargent
Attorney

Patented Apr. 27, 1943

2,317,938

UNITED STATES PATENT OFFICE 2,317,938

HIGH-SPEED HYDRAULIC TURBINE TRANS-
MISSION OR DRIVE

Harlie O. Putt, Elkhart, Ind.

Application July 31, 1940, Serial No. 348,866

14 Claims. (Cl. 170—62)

The object of my invention is to provide a flexible transmission or drive, having a wide variation of speed characteristics in relation to the speed of the driver, which, in the present adaptation, is designed to be operated by means of a wind driven variable pitch propeller of special design and construction, which is the subject of a copending patent application, Serial 351,516.

It is well known to those skilled in the art that the aerodynamic efficiency of a propeller increases with its speed—within reasonable limits—and that it has a very low starting torque, even in very high wind velocities. Hence it is highly advantageous to permit it to start rotating with a minimum degree of retardation before the load is connected, thereby permitting the highest possible operating efficiency of the propeller in winds of relatively low velocity, resulting in a greater overall efficiency and power output.

It is also generally well-known that a propeller cannot be employed to directly operate a conventional wind-mill pump because of its almost total lack of starting torque in moderate wind velocities of six to ten miles per hour; hence the relatively heavy, large surface wind-mill wheel with its correspondingly greater starting torque, is universally employed for this purpose. However, the greater surface area and weight of the wind-mill wheel reduces its safety factor to near zero, because of its sluggishness of control and for this reason it cannot operate safely even in moderately high winds.

The purpose of my invention is to develop power by means of a suitable wind-driven propeller directly attached to my hydraulic turbine structure, and transmit power, or a greater proportion of it, to the drive shaft, through the medium of a hydraulic turbine element, directly and securely attached to the said drive shaft, the speed of the turbine element automatically varying in relation to the speed of the propeller and the magnitude of the load connected direct to the turbine shaft, so that at low wind velocities or slow propeller speeds, the propeller may rotate faster than the turbine rotor and thus prevent the load from stalling the propeller in said low wind velocities.

Another object is to provide means whereby the load will be "disconnected" from the turbine drive-shaft when the speed and power of the propeller in any given low wind velocity is insufficient to carry the load, and to automatically pick up the load whenever the speed and power of the propeller is capable of driving the load, and to do this in a minutely gradual and progressive manner, smoothly and automatically; and at the same time, when the propeller speed and power is sufficient, drive the load at a greater speed than that of the propeller, as when driving an electric generator or high speed rotary pump, by means of my high speed hydraulic turbine element.

A further object of my invention is to provide an automatic means of hydraulic control of the maximum propeller speed, wherein the fluid pressure developed within the housing of my transmission is employed in combination with a suitable means to cause alteration in the pitch of the special propeller blades.

It is also an object to provide means and a modified structure wherein the transmission of power from the driving to the driven element is effected at a step-down or reduced speed ratio in relation to the propeller speed, for the purpose of securing greater torque at the drive or rotor shaft to operate relatively heavier or slow speed loads, such as a reciprocating pump, and wherein this structure is adaptable to replace the well-known wind-mill wheel for puming water. The means and method of controlling the maximum propeller speed of this modified structure is identical to that hereinbefore referred to in connection with my high speed turbine rotor structure and hereinafter more fully described.

It is also an object of my invention to provide hydraulic means and structure whereby power may be transmitted at a step-up speed ratio of maximum flexible variation proportional to speed and load for any purpose other than that illustrated and described, wherein power may be developed by any suitable means to drive my hydraulic turbine housing unit.

It is also an object to provide an inexpensive, simple and efficient structure and method to effect either a step-up or a step-down speed ratio in relation to the speed of the propeller or other driving medium for the purpose of operating electric generators, high speed rotary pumps, or other relatively high speed devices; and to provide a modified form of the invention to operate only at less speed of the propeller or other driving means, and to achieve this result with a minimum of parts or change in the manufacturing process and without increased cost.

I attain these and other objects of my invention by the mechanism illustrated in the accompanying drawings, and herein described, in which—

Fig. 3 is a bottom view looking up at Fig. 2, showing the housing hub member 2 of the housing;

Fig. 4 is a top view of the rotatable shank bearing 3a;

Fig. 5 is a cross sectional view of the hydraulic rotor on line 5—5 of Fig. 2 showing the dual-cupped formation;

Fig. 6 is an end elevation of the split clamp 8 which holds the hollow shaft 9;

Fig. 7 is a view partly in elevation and partly in section of a modified form of the invention, on line 7—7 of Fig. 8;

Fig. 8 is a front elevation, partly in section of the modified form shown in Fig. 7, on line 8—8 of Fig. 7;

Fig. 9 is a bottom view of Fig. 8;

Fig. 10 is a top plan view of the fluid vane control arms, and

Fig. 11 is a top plan view of member 3a.

Like characters of reference indicate like parts in each of the several views.

Figure 1:
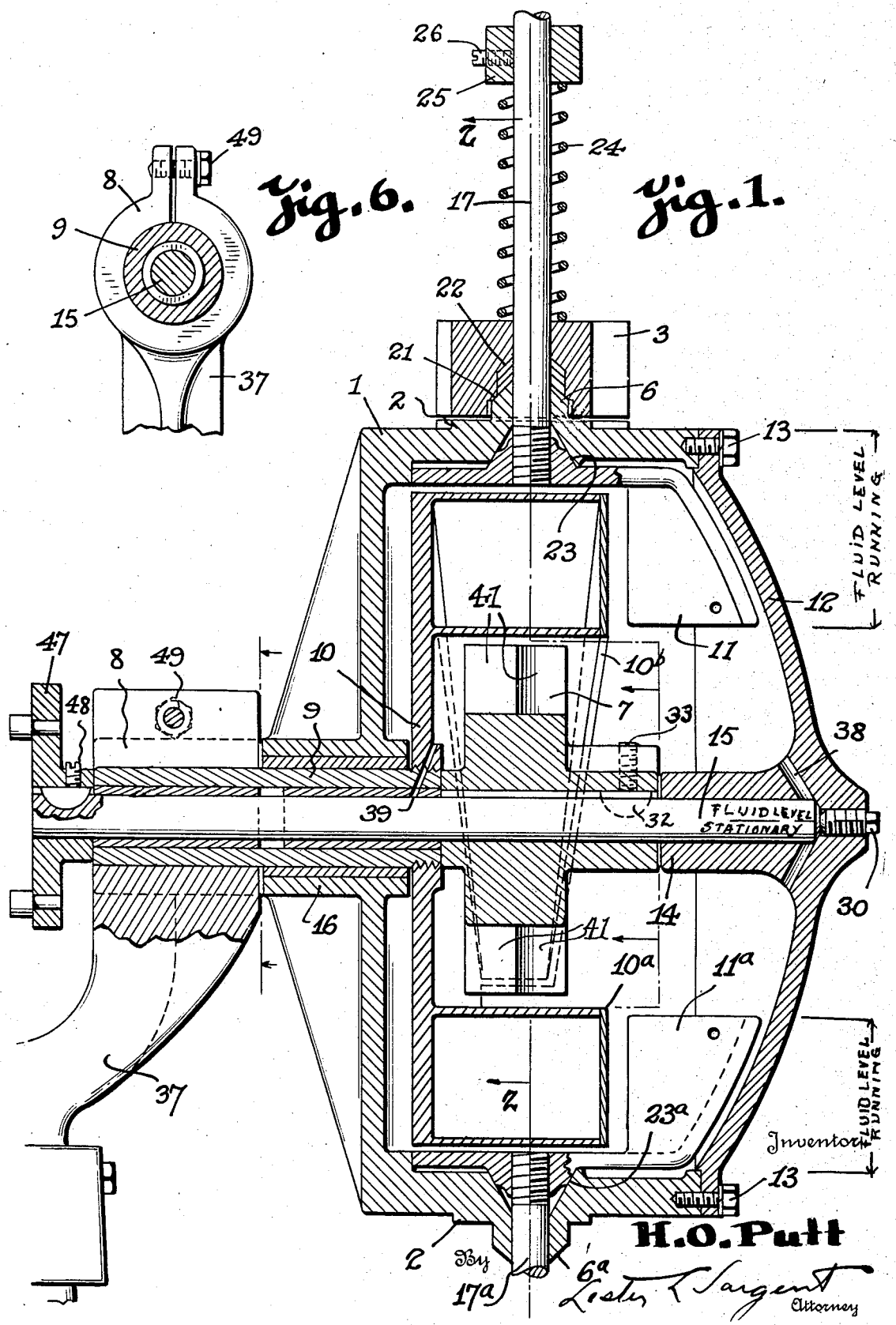
Figure 1 is a vertical section on line 1—1 of Fig. 2; partly in side elevation.

Referring to the drawings, I provide a suitable circular housing 1 to which is fitted, liquid tight, the cover 12 which is securely held in place by means of screws or bolts 13. The cover 12 is provided with a central inwardly projecting hollow shaft or boss 14, as shown in Fig. 1, which forms the front bearing for the rotor shaft 15. Housing 1 is also provided with a central hollow shaft or boss 16 which forms the rear housing for a hollow shaft 9. Like rotatable shank bearings 3 are affixed to control rods 17 and 17a by screws 53.

The hollow shaft 9 is held rigid by a split clamp member 8. A nozzle plate 10 is rigidly secured to shaft 9, as shown in Fig. 1. Shaft 9 is bored and bushed to form bearings for a rotor shaft 15. Rotor shaft 15 is provided with a suitable coupling member 47 at its rear extremity, as shown in Fig. 1.

Figure 2:
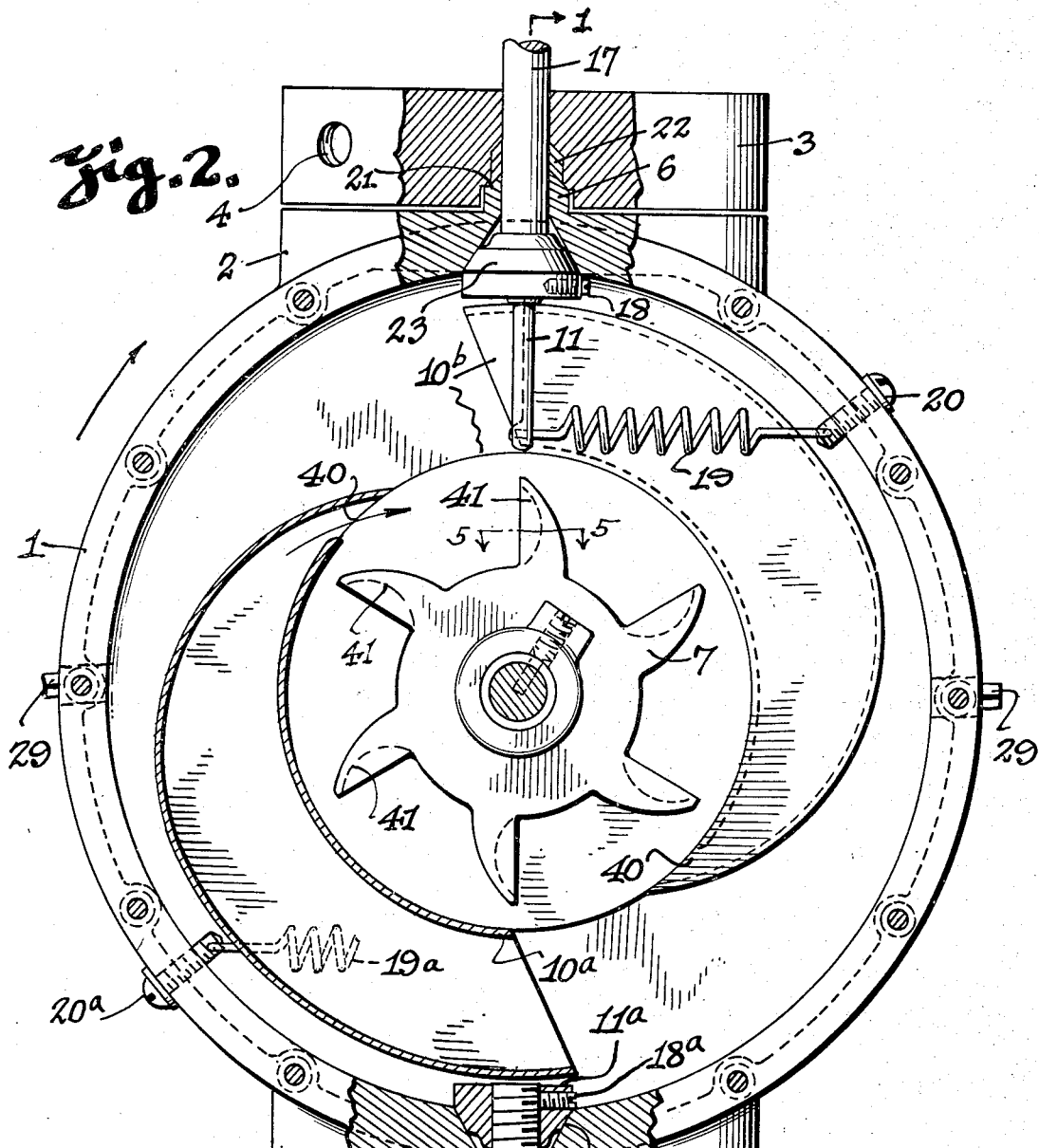
Fig. 2 is a front elevation, partly in section on the section line 2—2 of Fig. 1, with the cover removed.

As shown in Figs. 1 and 2, two tapered nozzles 10a and 10b are attached to or formed integral with the nozzle plate 10. The small end of each of these nozzles bends inwardly so that fluid will be ejected directly through openings 40 into the cupped pockets 41 of the rotor 7, to cause rotation of the latter in the direction of the hands of a clock, as shown by the arrows on Fig. 2.

Rotatably mounted in housing 1 are the pitch control rods 17 and 17a, each of which is threaded on one end, as shown in Figs. 1 and 2, and screw-threaded on the like fluid vane members 11 and 11a, respectively, and securely fastened thereto in any suitable manner as by means of set screws 18.

The extreme outward ends of control rods 17 and 17a are rigidly secured to the tips of the sheet metal propeller blades (not shown, but fully described in my co-pending application, Serial 351,516, which matured into Patent 2,302,054 Nov. 17, 1942, on Automatic variable pitch sheet metal propeller).

I provide springs 19 and 19a, as shown in Figs. 2 and 8, which are hooked into the appropriate vane members 11 and 11a at one end, and to appropriate screws or studs 20 and 20a at the other end, to maintain the rods and vane members in the extreme normal position indicated by dotted lines in Fig. 10.

Housing 1 has like opposite bosses 6 and 6a. Associated with boss 6 is a shoulder 21 which fits a tapered counterbore in the rotatable bearing 3, and forms a beveled bearing seat 21, so that the rotatable shank bearing 3 can turn with clearance from the housing hub member 2, and also act as a fluid seal, supplemented by a felt washer 22, as shown in Figs. 2 and 8. The hubs of the vanes 11 and 11a are each machine tapered to form the beveled seats 23 and 23a, respectively, with the housing. A compression spring 24 is positioned over the rod 17 between collar 25 and housing or hub member 3. Collar 25 is rigidly attached to rod 17 by suitable means such as the set screw 26. The compression spring 24 insures a fluid tight joint at bearing 21 and seat 23a. These beveled surfaces are maintained in close contact, and at the same time free turning movement of rotatable shank bearing 3 secured to rod 17 is permitted relative to housing 1. Centrifugal force generated when the housing is rotating further increases the tightness of the inner bearing contact between the fluid vane arms 11 and 11a and their seats in the housing, yet it does not prevent turning motion under the action of the control springs 19 and 19a and fluid pressure is against the fan-like vane arms 11 and 11a to change the pitch angle of the propeller blades (not shown) that are attached to the control rods 17 and 17a at their extreme outward tips, and to the like rotatable shank bearings 3, as more fully shown and described in my copending application Serial 351,616, entitled Automatic variable pitch sheet metal propeller.

Rod 17a with its associated structures is constructed in the same manner as the rod 17, bearing 3 and boss 6.

Figure 4:
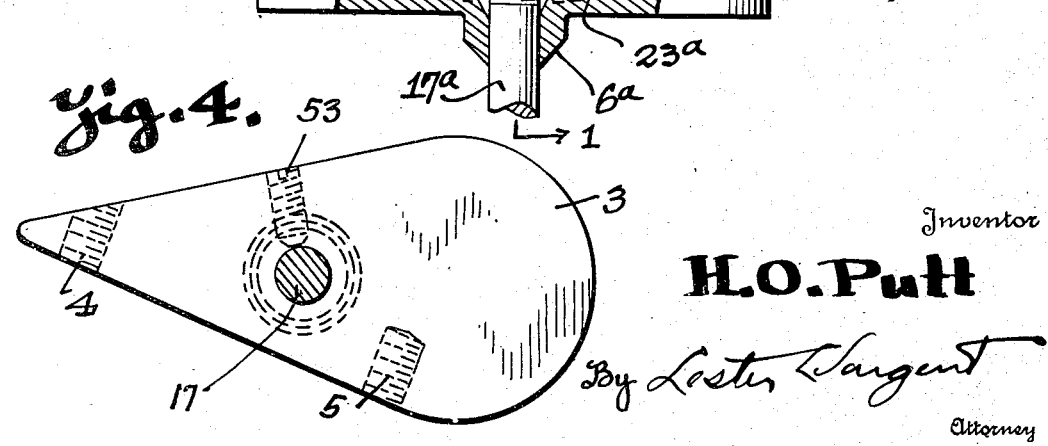

Housing extensions 2 are integral with the housing 1. Shank bearings 3, as shown in Figs. 1 and 2, do not touch housing extensions 2 but have a definite clearance from them. Therefore there is and can be no frictional engagement between members 2 and 3. The springs 24 press against the members 3 while the mechanism is being assembled or adjusted to obtain a bearing fit at the beveled seat 21 of boss 6 and to force the beveled surfaces 23 and 23a of the hubs of vanes 11 and 11a into bearing contact with their respective beveled seats in the housing, as shown for the purpose of forming an internal and external fluid seal. After the tension or pressure of the spring 24 has been secured by tightening the set screws 26 in the like collars 25 on the vanes 11 and 11a, along with the respective rods 17 and 17a to which they are affixed, are held rigid in their normal position, while the shank bearings 3, with propeller blades (not shown) in place and attached to the shank bearings 3, are twisted to the desired degree in a clockwise direction (see Fig. 4) and fastened to the respective rods 17 and 17a by means of set screws 53 or equivalent means. This imparts a definite pitch to the blades which is fixed, but may be altered or adjusted to any desired degree. Thus, the angle of the entire blade in relation to the wind is varied to a degree proportional to fluid pressure against the vanes 11 and 11a.

The turning movement of the vanes 11 and 11a is limited, as shown in Fig. 10, by the slotted sections 28 of the vanes 11 and 11a and by the studs 27 of the housing 1. Studs 27 may be either integral with housing 1, or attached to same. Housing 1 constitutes the hub of the propeller and is free to rotate on its bearing without turning the shaft 15.

Vanes 11 and 11a are not attached to the housing. They are attached to the rods 17 and 17a respectively, which have a bearing in the housing and rotate with it. The fluid will lag, or tend to lag, behind the rotative speed of the housing due to the relative obstruction or retardation of fluid movement at the large opening of the nozzles 10a and 10b. This retardation of fluid movement at these two points will increase with the increased speed of the housing, thereby inducing an increased difference of fluid movement between the fluid and the housing. In other words, as the speed of the housing increases, fluid will "pile up" at the large opening of the nozzles (which are stationary), and for some little distance ahead of the large nozzle opening; hence, the speed or velocity of fluid movement in this area will be considerably less than movement of fluid in other areas. As the housing rotates, each vane passes the area of each larger nozzle opening once per revolution, and the increased fluid pressure against the vanes causes them to move around in the opposite direction of rotation against the tension of the springs 19 and 19a, thus causing the rod 17 and 17a and their propeller blades to move in the same direction and to the same degree. This movement effects the control of the propeller blade in respect to its position or angle in relation to wind direction. The pitch of the blade is not altered, but the pitch-angle of the blade is altered—as the entire blade is moved. The pitch of the blade is a fixed factor and may be varied or "set" to any desired degree and locked as described.

While these fluid pressure pulsations against the vanes 11 and 11a occur but twice per revolution of housing, the effect is almost equal to a continual pressure because the pulsations occur so rapidly at high speed of the housing, which high speed is the point or time that is wanted in this propeller blade control to start, and which is determined by the tension of the springs 19 and 19a.

I provide filler plugs 29, positioned diametrically opposite each other in the periphery of the housing, as shown in Fig. 2. An overflow plug 30 centrally located is provided in the cover 12, as shown. Housing 1 is revolved until one of the filler plugs 29 is uppermost, and said filler plug is then removed, as is also the overflow plug 30. The housing is then filled with a light oil until the level is up to the overflow then all plugs are replaced and screwed tight.

In either the high speed form of my invention (Figs. 1 and 2), or the modified low speed form of my invention (Figs. 7 and 8), the hydraulic rotors will rotate in the same direction as the housing. In the drawings, this diretcion is as indicated in Fig. 2—from left to right.

While the drawings illustrate the use of but two propeller blades diametrically positioned to the housing, it will be obvious that three or more blades may be employed, equally spaced around the housing 1.

Assuming that the housing 1 is properly fitted with propeller blades mounted in its tower bracket 37, as shown in Fig. 1, and properly filled with a suitable fluid up to the stationary level indicated at 30, and the coupling 41 is connected to a load such as an electric generator, the device is ready to operate. As the wind causes the propeller and housing to rotate in the direction indicated in Fig. 2, it will be obvious that very little wind velocity would be required to start this rotation because the propeller and housing unit would turn freely on its bearings and the only resistance encountered would be the bearing friction and the fluid resistance within the housing. This resistance will not interfere with the acceleration of the propeller, and its speed increases to a maximum for a given wind velocity.

During the starting and acceleration of the propeller unit, the rotor 7 remains stationary. As soon as the speed of the propeller increases to the point where the developed centrifugal forces act on the fluid within the housing the fluid is thrown outwardly around the internal periphery of the housing and is forced into the large openings of the stationary tapered nozzles 10ᵃ and 10ᵇ, from whence it is ejected through the small or restricted openings or jets 40 of said tapered nozzles 10ᵃ and 10ᵇ against the cupped rotor pockets 41. Rotor 7 is thereby caused to rotate in the same direction as the housing.

As the speed of the propeller unit increases, the fluid pressure at the large end or opening of each of the nozzles also increases, which induces greater velocity and pressure of fluid against the rotor pockets and consequently greater speed and power of the rotor. If the area of discharge opening is one-half the area of intake opening of the nozzles, the velocity of discharge will approximate four times the velocity of intake. This increased fluid velocity projected against a smaller diameter rotor greatly increases the speed ratio of the rotor in relation to the speed of the propeller unit. In other words, at a certain wind velocity, the propeller may be rotating at 200 R. P. M. while the rotor may be rotating at 600 R. P. M. or 1000 R. P. M, depending upon the differential fluid velocities of inlet and discharge and the load on the rotor.

When the rotor speed has reached a maximum for a given purpose or application, the value of which is determined by the tension of the control springs 19 and 19a, the fluid pressure against one side of the vane arms 11 and 11a forces these vanes away from their normal positions, causing a turning motion of the control rods 17 and 17a, which in turn alters the pitch of the sheet metal propeller blades which are rigidly attached to the said rods at their extremities (not shown here, but specifically described and illustrated in my co-pending application).

This controlling action takes place at the same time on each propeller blade assembly because the hydrostatic pressure is equal at all points at any given instant and for this reason it is not necessary to link these controls together mechanically to secure synchronous action. This hydraulic control system utilizes the same medium and forces that are developed for the transmission of power and is smooth, simple and positive in action.

The use of the high speed ratio between the rotor 7 and propeller assembly permits the acceleration of the electric generator or other load up to a miximum or "cut-in" voltage in moderate wind velocities and lower propeller speeds whereby useful work may be done upon slight increase in wind velocity. Otherwise, the only alternative would be the use of a high gear ratio which would prevent the propeller from starting in low wind velocities or else lowering the "cut-in" characteristics of the generator by winding it with finer wire, which would reduce the maximum capacity and increase the danger of burn out and other trouble.

My hydraulic turbine high speed transmission propeller unit permits of using generators of minimum size and maximum capacity; provides for easy starting in the lowest wind velocities; rapidly increases generator speed without greatly increased propeller speed up to the "cut-in" speed of the generator; and automatically adjusts its speed ratio to wind velocity and load. This is accomplished in the following manner:

When starting, the propeller may be rotating at, say ten or twenty R. P. M., while the rotor will make but three or four revolutions, depending on the "drag" of its load, but as the propeller accelerates, the rotor will also accelerate faster, until at some definite propeller speed, the rotor will be running at the same speed; then, if the propeller accelerates still more, the rotor will finally be running faster than the propeller. This increase in rotor speed over that of the propeller will depend upon and be governed by the increase in load, other factors being equal.

After its force has been spent against the rotor vanes or pockets, the fluid is diverted, both sidewise and outwardly by virtue of the curved pockets or recesses 41 in the vanes of the rotor, as indicated in Figs. 2 and 5. This spent fluid is immediately and continuously returned to the inner circumference of the housing to again be forced through the nozzles and against the rotor vanes, the rotation of the rotor itself assisting in throwing the fluid away from it by centrifugal action.

As the speed of the propeller and housing increases, the action of centrifugal force on the fluid increases, throwing same outward against the inner periphery of the housing with greater force and also increasing the velocity and pressure of fluid into the intake openings of the nozzles 10 and 10a and the fluid therein. This causes an increased fluid pressure and velocity of discharge from the nozzle jets 40 and against the rotor, thus greatly accelerating the speed of the rotor.

The turbine rotor speed will be proportional to the propeller speed and the load on the rotor, but will tend to operate at higher speeds than the propeller unless the load increases faster than the fluid velocity and pressure, which will not occur with a given size or capacity of transmission unless overloaded. It is understood that the device must be properly proportioned for the particular operating conditions and requirements for which it is intended.

Because the propeller is always positively controlled, it need not be reefed out of the wind during storm periods, as its high safety factor permits it to be operated in any wind velocity that will not wreck substantial buildings. Hence, no attention is required to protect it from severe wind velocities. However, if it is desired to stop the propeller unit from rotating, conventional means for the purpose may be provided, such as hinged pilot vanes, as employed on a majority of wind-mills.

If the device is to be employed to drive an electric generator or other high speed device, a suitable coupling member 47 (Fig. 1) may be employed to couple the transmission drive shaft to the generator, which would be positioned on the clamp-bracket 37, journalled on a suitable tower-cap bearing in the conventional manner. A suitable housing 52, such as shown in Fig. 7, for the generator (not shown) or other apparatus may be provided to protect them from the weather.

If the transmission and propeller unit are to be removed for any purpose, it is only necesary to remove the coupling member 47 (shown in Fig. 1), loosen the clamp bolt 49 and pull the transmission and propeller assembly from the bracket support 37.

Figures 7, 11:
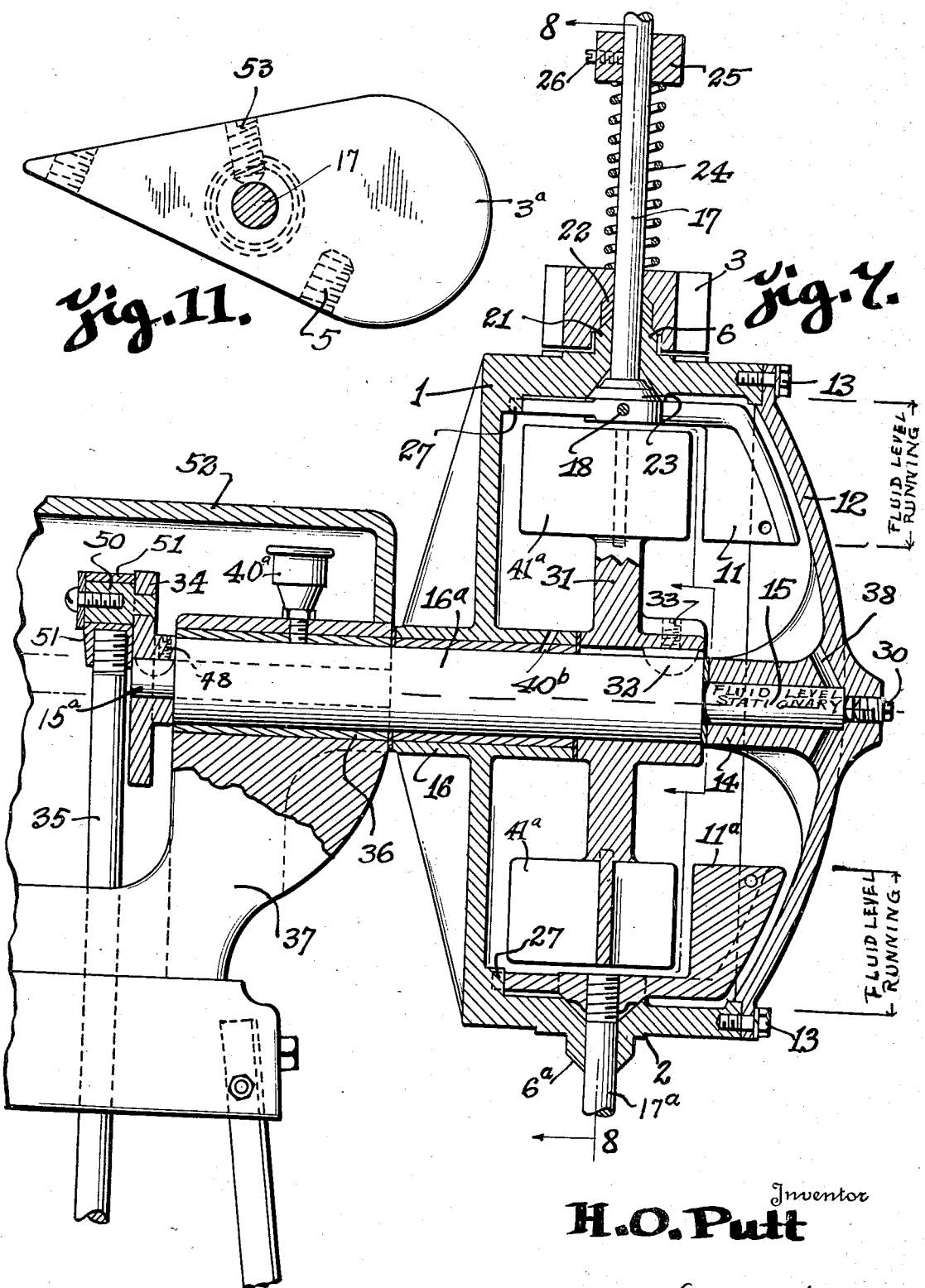

A modification of this device is illustrated in Figs. 7 and 8, wherein the same housing and propeller structure and control means are employed in combination with a slow speed rotor having a maximum diameter and torque for the purpose of transmitting power at a slower speed than the propeller, and in no case at a higher speed than the propeller and housing rotates.

As shown in Figs. 7 and 8, the rotor 31 is formed with a number of vanes or paddles 41a with their faces slightly curved in the direction of rotation and with a suitable hub which is rigidly secured to the shaft 16a by means of a key 32 and set-screws 33, as shown. One end of the shaft 16a is reduced in diameter as shown at 15 and has a bearing in the cover 12 which is provided with a boss 14 for the purpose. The opposite end 15a of the shaft 16a is keyed to a suitable crank-disc 34 which operates the reciprocating pump rod 35 in the conventional manner. As shown in Fig. 7, shaft 16a rotates in a bearing 36 which may be formed integral with the main frame member or tower bracket 37 which is rotatably mounted on top of the tower in the conventional manner.

Referring to Fig. 1, the shaft 15 receives lubrication through an oil hole 38 in the cover 12 and through an oil hole 39 in stationary nozzle plate 10. The relatively larger shaft 16a is lubricated by the oil hole 40b and grease-cup 40a, as shown in Fig. 7. Shank bearing 3a of Fig. 7 functions like shank bearing 3 of Fig. 1.

Referring to Fig. 7, a rotor shaft 16a has its bearing 36 in the bracket casting 37 which is fulcrumed on a suitable tower-cap at the top of a tower or other support whereby it is free to turn in the direction of the wind in the conventional manner. The opposite reduced end 15 of this rotor shaft is mounted on bearing 14 of the cover 12. Rigidly keyed at 33 to the shaft 16a within the housing 1 is the rotor 31 held rigidly in position by the key 32 and set screw 33. Rotor 31 is provided with a plurality of facets or paddles 41a which are submerged in the fluid when same is at the running levels shown, and over half submerged when the housing is stationary or rotating at very low speeds, corresponding to the stationary fluid level indicated.

As in the first form of my invention, the propeller and housing are free to rotate without retardation, except the slight fluid "drag" as the propeller starts to rotate. As it accelerates faster, the fluid is thrown outwardly around the interior of the housing and tends to rotate with it, exerting fluid pressure against the paddle area of the rotor and causing a turning effort of the rotor, the value of magnitude of which will vary with the propeller speed. When the speed of the housing is sufficiently high, the fluid pressure on the rotor forces it to revolve at a speed proportional to the load, but never faster than the propeller and housing speeds.

Assume that the rotor is mechanically connected to a pump (vertical wind-mill type) by means of the vertical reciprocating pump rod 35, as shown in Fig. 7, the fluid resting in the bottom half of the housing 1, as shown.

Now a breeze springs up which reacts on the propeller to cause rotation of the housing against the slight drag of the fluid therein. This slight drag at the initial start of the propeller rotation is the only load or retarding influence and because of its low value, permits the propeller to start rotation in the lowest wind velocity. However, the rotor 31 will not start to rotate until the rotative speed of the propeller and housing has increased to such a degree that fluid pressure thereby developed will be great enough to overcome the static pump load. Thus, up to this point the rotor 31 has remained stationary and caused a "retarding" action on the fluid, hence, the fluid cannot rotate at the same speed as the housing and the vanes 11 and 11a. For this reason fluid pressure is developed against the paddles 41a on their curved faces and also against the forward faces of the vanes 11 and 11a. These vanes cannot move to alter propeller pitch, however, until the fluid pressure against their forward faces is great enough to overcome the tension of the springs 19 and 19a, which tension is predetermined to permit action at some predetermined propeller speed. This predetermined maximum propeller speed will depend upon the magnitude of the "load" that is to be operated. Thus, if the maximum stroke speed of the pump is determined at say 20 to 25 strokes per minute, then the tension of the springs 19 and 19a would be of such value as to permit the propeller to accelerate to such maximum speed as would permit of development of fluid pressure against the paddles of the rotor 31 to cause said rotor to rotate at the desired maximum speed of 20 to 25 R. P. M. while the propeller, housing and vanes 11 and 11a may be rotating at speeds from 10 to 20 times as great, depending entirely upon the magnitude of the pump load. Therefore, even at top or maximum propeller and housing speeds, the speed of the rotor 31 will be so relatively slow that the retardation effect on the fluid will increase with increase of propeller or housing speed, thus building up an increased torque or "turning effort" of the rotor to drive the pump at its maximum stroke speed, or any other device at its maximum load speed.

In this device, speed of the driving element (propeller) is traded for torque in the rotor 31 and the combination actually constitutes a "torque converter" for the purpose required. Also the fluid within the housing can never rotate with the speed of the housing or parts rigidly connected therewith unless the said rotor is completely disconnected from any load factor. The greater this load factor, the greater the propeller speed must be to drive the load. In other words, the greater the ratio or differential of speed between the housing 1 and the fluid must be to develop sufficient fluid pressure to drive the load. In case of a relatively light load, such as a shallow-well pump, for instance it may develop sufficient fluid pressure to start and operate the pump when the propeller reaches a speed of say 200 R. P. M. If the maximum stroke speed of such a pump was 40 strokes per minute, then the ratio between propeller and rotor speed would be 5 to 1 and the tension of the springs 19 and 19a would be such as to permit control of propeller pitch under the reaction of fluid pressure developed at this operating speed, but if the load was a deep well pump, or a larger pump or greater load, requiring greater power to drive, then greater tension of springs 19 and 19a would be provided so that the propeller could accelerate to greater speed or R. P. M. in order to develop greater fluid pressure (greater difference in velocity between fluid and housing) to drive the greater load, wherein the propeller speed may reach say 400 R. P. M., while the maximum stroke speed of the larger pump would be reduced somewhat, say to 30 strokes per minute. Thus the ratio between propeller and rotor speed would be approximately 13 to 1, assuming that we employ the same size propeller, housing and rotor in both cases. It will be understood that a larger propeller, housing and rotor, or even the same size propeller with a larger housing and rotor may be provided to drive the greater load at a lower propeller speed, providing the load is within the capacity of the propeller, because the larger housing provides for greater fluid capacity and greater paddle area and diameter or lever arm of rotor and also greater area and lever arm factors of the vanes 11 and 11a, permitting the use of heavier spirngs 19 and 19a if desired.

If the rotor 31 were free to rotate. That is, did not have to do useful work, then it could and would rotate with the fluid. Thus, the paddles 41a, housing 1 and vanes 11 and 11a would all rotate at the same speed as the fluid and, there would be no differential fluid pressure on the vanes 11 and 11a to effect control of propeller pitch. The device is not intended to operate without a definite and predetermined load on the rotor 31. Therefore, differential fluid pressures will develop as soon as the housing 1 starts rotating and said pressures will increase with increase of speed of the housing until sufficient fluid pressure against the paddles 41a starts rotation of said rotor 31.

The slightest load on the rotor 31 will cause it to hang back or "resist" the turning point of the fluid. Therefore, it will rotate at a slower speed than the housing 1 and cause the fluid to reduce its speed of rotation in relation to the speed of the housing and vanes 11 and 11a. This mans simply that "fluid pressure" will be built up against the curved faces of the paddles 41a and between the forward faces of the vanes 11 and 11a and the fluid and that this developed fluid pressure will increase with increased speed of the housing 1.

The paddles 41a react on the fluid to "slow it" in relation to the housing, while the vanes 11 and 11a react on the fluid to accelerate it, thus exerting pressure on the advancing face areas of the vanes 11 and 11a, which, when said pressure is of sufficient magnitude, causes these vanes 11 and 11a to move rearwardly to effect the required change in propeller pitch to control the speed thereof, against the tension of the springs 19 and 19a.

At the extreme external end of the rotor shaft 16a a suitable crank-disc (or crank) 34 is securely keyed, as shown in Fig. 7. This crank disc is provided with a crank pin 50 on which is mounted a suitable connecting rod bearing 51, which in turn is securely attached to the connecting rod or reciprocating pump rod 35 in the conventional manner. This connecting rod 35 may be secured to the conventional wind-mill pump rod in any suitable manner for the purpose of operating the old wind-mill pump, located at the base of the tower, in the conventional manner.

Instead of the crank disc 34, suitable coupling of any desired type may be provided and rigidly keyed to the shaft 16a to operate any rotative device which does not require an operating speed in excess of the R. P. M. of the propeller housing and rotor 31.

This modified slow speed transmission is specifically intended to be employed in combination with my variable pitch propeller previously mentioned, to replace the old style wind-mill wheel commonly employed for pumping water with a conventional reciprocating pump. It may be mounted on the old wind-mill tower and connected up to the old wind-mill pump and will afford a greater measure of safety in high velocity storm winds and from two to four times the efficiency of a wind-mill wheel of the same diameter, and is operative over a greater range of wind velocities and is always under positive control.

One of these hydraulic propeller units complete would weigh about one-half as much as a wheel rig of the same diameter, and can be manufactured and sold at no increased cost over that of a wheel rig; and will not only operate with greater efficiency and safety, but do so in wind velocities that would completely wreck a conventional wind-mill. It is applicable to any type of wind-power job that does not require in excess of five or six H. P. maximum output.

In the foregoing specification and drawings, my transmission forms the hub for the special automatic variable pitch sheet metal propeller blades as described in my co-pending application, but I do not restrict the use of my invention to the described application alone. I may modify and alter the design so as to be driven by any type of power desired, to meet special requirements.

What I claim is:

1. In a hydraulic turbine transmission, the combination of a support, a hollow shaft held stationary by the support, stationary tapered nozzles affixed to the hollow shaft, an inner rotatable shaft mounted in the hollow shaft, a rotor on said inner rotatable shaft, a coupling attached to the end of said inner rotatable shaft, a circular housing rotatably mounted on the hollow shaft and in which the aforesaid inner rotatable shaft is loosely mounted, said circular housing enclosing the aforesaid tapered nozzles, a plurality of control rods adapted to carry wind-driven propeller blades radially mounted in said circular housing, vanes within the circular housing affixed to the inner ends of said rods, and spring mechanism tending to hold the vanes and rods in a predetermined but variable position.

2. In a hydraulic turbine transmission, the combination of a support, a hollow shaft releasably clamped in said support, a nozzle plate secured to said shaft, oppositely disposed tapered curved nozzles integral with said nozzle plate and having reduced sized openings at their inner ends, a rotor having cupped vanes to receive the impact of fluid forced through said tapered nozzles, an inner shaft on which said rotor is keyed, said inner shaft being loosely mounted in bearings in the aforesaid hollow shaft, a coupling detachably secured on the end of said inner shaft, a circular housing rotatably mounted on the hollow shaft and enclosing the tapered nozzles and rotor, a fluid filling one half of said circular housing, control rods radiating from and rotatably mounted in said circular housing, said rods being adapted to carry wind-driven propeller blades, fluid actuated vanes secured to the inner ends of said rods to automatically regulate the pitch of the blades.

3. In combination with the mechanism defined in claim 1, the aforesaid circular housing having integral tapered bosses encircling the aforesaid radiating rods, recessed cap members rotatably seated on said bosses and adjustably fastened to the radiating rods, springs bearing on said cap members, and collars affixed to the rods and spaced from the cap members and against which the springs are compressed, whereby to force the beveled surfaces of the cap members and of the bosses into bearing contact for the purpose of forming an internal and external fluid seal.

4. In a hydraulic turbine transmission, the combination of a support, a rotatable shaft mounted in said support, a coupling affixed to the end of the shaft, a circular housing loosely mounted on the shaft, a plurality of control rods adapted to carry wind-driven propeller blades mounted in radial position in said circular housing, vanes within the circular housing affixed to the inner ends of said rods, the housing having recessed portions, said vones having a beveled shank bearing against the corresponding recessed portion of the housing, and springs attached to the shank and to the housing tending to hold the vanes and control rods in a predetermined position but variable under pressure of the wind.

5. In a hydraulic turbine transmission, the combination of a support, a hollow shaft mounted in the support, stationary tapered nozzles affixed to the hollow shaft, an inner rotatable shaft mounted in the hollow shaft, a rotor on said inner rotatable shaft, a coupling attached to the end of said inner rotatable shaft, a circular housing rotatably mounted on the hollow shaft and in which the aforesaid inner rotatable shaft is loosely mounted, said circular housing enclosing the aforesaid tapered nozzles, a plurality of control rods adapted to carry wind-driven propeller blades radially mounted in said circular housing, vanes within the circular housing affixed to the inner ends of said rods, spring mechanism tending to hold the vanes and control rods in a predetermined but variable position, the circular housing having integral conical bearing studs, rotatable shank bearings having conical recessed portions seated on said bearing studs, said shank bearings being affixed to the control rods, and compression springs pressing on the shank bearings for the purpose of forming a fluid seal.

6. In a hydraulic turbine transmission, the combination of a support, a hollow shaft mounted in said support, a circular housing rotatably mounted on the hollow shaft, stationary tapered nozzles rigidly supported from the hollow shaft within the circular housing having openings of reduced size at their inner ends, a rotatable transmission shaft loosely mounted within the circular housing, a rotor within the circular housing keyed to said rotatable transmission shaft, a coupling affixed to the outer end of said rotatable transmission shaft, radiating rods mounted in the circular housing and adapted to carry wind-driven propeller blades, said rods being rotatably mounted, fluid-actuated vanes within the housing affixed to the inner ends of said rods, and spring means tending to hold said vanes and rods in a predetermined position but permitting of variation under pressure.

7. In a hydraulic turbine transmission, the combination of a support, a hollow shaft mounted in said support, a circular housing rotatably mounted on the hollow shaft, stationary tapered nozzles rigidly supported from the hollow shaft within the circular housing having openings of reduced size at their inner ends, a rotatable transmission shaft loosely mounted within the circular housing, a rotor within the circular housing keyed to said rotatable transmission shaft, a coupling affixed to the outer end of said rotatable transmission shaft, radiating rods mounted in the circular housing and adapted to carry wind-driven propeller blades, said rods being rotatably mounted, fluid actuated vanes within the housing affixed to the inner ends of said rods, and spring means tending to hold said vanes and rods in a predetermined position but permitting of variation under pressure, said circular housing having a removable liquid-tight cover plate.

8. In a hydraulic turbine transmission, the combination of a support, a hollow shaft mounted in said support, a circular housing rotatably mounted on the hollow shaft, stationary tapered nozzles rigidly supported from the hollow shaft within the circular housing having openings of reduced size at their inner ends, a rotatable transmission shaft loosely mounted within the circular housing, a rotor within the circular housing keyed to said rotatable transmission shaft, a coupling affixed to the outer end of said rotatable transmission shaft, radiating rods mounted in the circular housing and adapted to carry wind-driven propeller blades, said rods being rotatably mounted, fluid actuated vanes within the housing affixed to the inner ends of said rods, and spring means tending to hold said vanes and rods in a predetermined position but permitting of variation under pressure, said rotatable transmission shaft having a detachably mounted coupling member, whereby the entire unit may be removed from the support when the coupling is detached.

9. In a hydraulic turbine transmission, the combination of a support, a shaft rotatably mounted in the support, a rotor keyed to the shaft, a circular housing rotatably mounted on the shaft, the shaft having a reduced end loosely mounted in the circular housing, radiating rods mounted in the circular housing and adapted to carry wind-driven propeller blades, fluid-actuated vanes within the circular housing, said vanes having their shanks affixed to the aforesaid radiating rods, means on the circular housing for limiting the swinging movement of said vanes, and springs secured to said vanes and to the circular housing and tending to hold the vanes and radiating rods in a predetermined position.

10. In combination with the mechanism defined in claim 9, a crank disc detachably keyed to the aforesaid rotatable shaft, and means connecting said crank disc with a reciprocating pump rod.

11. In a hydraulic turbine transmission, the combination of a support, a shaft rotatably mounted in the support, a rotor keyed to the shaft, a circular housing rotatably mounted on the shaft, the shaft having a reduced end loosely mounted in the circular housing, radiating rods mounted in the circular housing and adapted to carry wind-driven propeller blades, fluid actuated vanes within the circular housing, said vanes having their shanks affixed to the aforesaid radiating rods, means on the circular housing for limiting the swinging movement of said vanes, and springs secured to said vanes and to the circular housing and tending to hold the vanes and rods to which they are affixed in a predetermined position, said circular housing having a detachable cover plate, said cover plate having an inwardly projecting boss functioning as a bearing for the reduced end of the rotatable shaft.

12. In a hydraulic turbine transmission, the combination of a support, a shaft rotatably mounted in the support, a rotor keyed to the shaft, a circular housing rotatably mounted on the shaft, the shaft having a reduced end loosely mounted in the circular housing, radiating rods mounted in the circular housing and adapted to carry wind-driven propeller blades, fluid actuated vanes within the circular housing, said vanes having their shanks affixed to the aforesaid radiating rods, means on the circular housing for limiting the swinging movement of said vanes, springs secured to said vanes and to the circular housing and tending to hold the vanes and rods to which they are affixed in a predetermined position, said circular housing having radiating bosses in which the radiating rods are mounted, shank bearings having correspondingly shaped recesses supported on said bosses, said shank bearings being affixed to the radiating rods, washers between said shank bearings and bosses, a compression spring surrounding each of said rods and bearings on the shank bearings, and means for holding said compression spring in compressed position on the rod, whereby to effect a fluid seal between the shank bearings and the bosses.

13. In a hydraulic turbine transmission, the combination of a support, a shaft rotatably mounted in the support, a rotor keyed to the shaft, a housing rotatably mounted on the shaft and containing a fluid, the shaft having one end loosely mounted in the housing, radiating rods mounted in the housing and adapted to carry wind-driven propeller blades, fluid-actuated vanes within the circular housing, said vanes being operatively connected to the aforesaid radiating rods, means for limiting the swinging movement of said vanes, and spring secured to each of said vanes and to the housing and tending to hold the vanes and rods to which they are operatively connected in a predetermined position.

14. In a hydraulic turbine transmission, the combination of a support, a rotatable shaft mounted in the support, a rotor keyed to said shaft, a housing rotatably mounted on the shaft and containing a fluid, the shaft having one end loosely mounted in the housing, radiating rods mounted in the housing and adapted to carry wind-driven propeller blades, fluid-actuated vanes within the circular housing, said vanes being operatively connected to the aforesaid radiating rods, means for limiting the swinging movement of said vanes, springs secured to each of said vanes and to the housing and tending to hold the vanes and rods to which they are operatively connected in a predetermined position, a crank disc detachably keyed to the aforesaid rotatable shaft, a reciprocating pump rod, and means connecting said crank disc with the reciprocating pump rod.

HARLIE O. PUTT.